(12) United States Patent
Watanabe et al.

(10) Patent No.: US 11,318,695 B2
(45) Date of Patent: May 3, 2022

(54) TIRE MANUFACTURING METHOD AND TIRE

(71) Applicant: SUMITOMO RUBBER INDUSTRIES, LTD., Hyogo (JP)

(72) Inventors: Takuma Watanabe, Hyogo (JP); Rung Yimpoopha, Rayong (TH); Sittichai Apaikawin, Rayong (TH)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 324 days.

(21) Appl. No.: 16/270,791

(22) Filed: Feb. 8, 2019

(65) Prior Publication Data

US 2019/0248087 A1    Aug. 15, 2019

(30) Foreign Application Priority Data

Feb. 13, 2018    (JP) .............................. JP2018-023334

(51) Int. Cl.
*B29D 30/72*    (2006.01)
*B29C 48/49*    (2019.01)
(Continued)

(52) U.S. Cl.
CPC .............. *B29D 30/72* (2013.01); *B29C 48/49* (2019.02); *B60C 13/00* (2013.01); *B29C 48/07* (2019.02);
(Continued)

(58) Field of Classification Search
USPC .................................................... 156/130.7
See application file for complete search history.

(56) References Cited

U.S. PATENT DOCUMENTS

2005/0271761 A1\* 12/2005 Ohki ..................... B29B 7/7495
425/133.5
2006/0237112 A1\* 10/2006 Nishitani ............... B29D 30/30
152/524
(Continued)

FOREIGN PATENT DOCUMENTS

EP    2147770 A1    1/2010
JP    2000-025413 A    1/2000
(Continued)

OTHER PUBLICATIONS

ESpaceNet Translation of JP2014051136 (Year: 2021).\*
European Search Report, European Patent Office, Patent Application No. 19152085.7, dated Jun. 28, 2019.

*Primary Examiner* — Katelyn W Smith
*Assistant Examiner* — Alexander D Booth
(74) *Attorney, Agent, or Firm* — Greenblum & Bernstein, P.L.C.

(57) ABSTRACT

A tire having a rubber assembly including a first rubber member, a second rubber member, and a third rubber member which are arranged in series in the cross-section including the tire rotational axis. The method includes: extruding the unvulcanized rubber assembly as two separate parts which are a first extrusion rubber portion and a second extrusion rubber portion divided at a division surface passing through the unvulcanized first rubber member; winding the first extrusion rubber portion into a base annular body; and forming the unvulcanized rubber assembly by winding the second extrusion rubber portion so that only the first rubber member included in the second extrusion rubber portion overlaps with the first rubber member included in the base annular body.

15 Claims, 5 Drawing Sheets

(51) Int. Cl.
  *B60C 13/00*   (2006.01)
  *B29L 30/00*   (2006.01)
  *B29C 48/21*   (2019.01)
  *B29K 21/00*   (2006.01)
  *B29C 48/07*   (2019.01)
  *B29C 48/12*   (2019.01)

(52) U.S. Cl.
  CPC .............. *B29C 48/12* (2019.02); *B29C 48/21* (2019.02); *B29D 2030/722* (2013.01); *B29K 2021/00* (2013.01); *B29L 2030/00* (2013.01)

(56) References Cited

U.S. PATENT DOCUMENTS

| | | | | |
|---|---|---|---|---|
| 2008/0156407 | A1* | 7/2008 | Sakamoto | B29D 30/72 152/454 |
| 2010/0140832 | A1* | 6/2010 | Ashimoto | B29C 48/21 264/173.12 |
| 2018/0236738 | A1* | 8/2018 | Mancini | B29D 30/0016 |

FOREIGN PATENT DOCUMENTS

| | | |
|---|---|---|
| JP | 2014-051136 A | 3/2014 |
| JP | 2015-085544 A | 5/2015 |
| KR | 20160064284 A | 6/2016 |

\* cited by examiner

TIRE MANUFACTURING METHOD AND TIRE

TECHNICAL FIELD

The present invention relates to a tire manufacturing method and a tire, more particularly to a tire including a rubber assembly of plural kinds of rubber members made of different compositions and joined together, and a method for manufacturing the rubber assembly.

BACKGROUND ART

Japanese Patent Application Publication No. 2015-085544 (Patent Document 1) discloses that a sidewall rubber, a cushion rubber and a clinch rubber which are rubber members of a pneumatic tire made of different rubber compositions are simultaneously extruded by a multiplex extruder.

In recent years, on the other hand, depending on various demands, the rubber volume of the tire may become locally large. In the case of a multi-layered rubber extrudate, when the rubber volume is locally increased, heat dissipation of the extrudate after being extruded is remarkably deteriorated, and as a result, there is a possibility that the extrudate is used for building a green tire in a state where the heat is not sufficiently dissipated. In such a case, the multi-layered rubber extrudate is deformed after assembled in the green tire, which may lead to defects in the green tire. In addition, there is a problem of deteriorating the uniformity of the finished tire.

In recent years, on the other hand, there is a tendency to provide protruding portions in the shoulder portions and the sidewall portions of a tire for cross country cars, SUV, etc., in consideration of the resistance to external injury as well as the user's preference for tire appearance. Such protruding portions increase the rubber volume locally. Therefore, in this type of tire, there is a problem that the above-mentioned defects occur remarkably.

SUMMARY OF THE INVENTION

It is therefore, an object of the present invention to provide a tire having excellent uniformity and durability and a method for manufacturing such tire.

According to one aspect of the present invention, a tire comprises:
a rubber assembly of
a first rubber member made of a first rubber composition,
a second rubber member made of a second rubber composition different from the first rubber composition, and
a third rubber member made of a third rubber composition different from the first rubber composition,
wherein
in a cross-section of the tire including the rotational axis of the tire, the rubber assembly extends in a direction,
the second rubber member is connected to a first end portion of the first rubber member in the above-said direction, and
the third rubber member is connected to a second end portion of the first rubber member in the above-said direction,
wherein
the first rubber member includes an interfacial boundary between two portions of the first rubber member which have been extruded separately and then united through a vulcanization process.

According to another aspect of the present invention, a method for manufacturing the above-mentioned tire is provided, wherein the method comprises:
a step of extruding a first extrusion rubber portion and a second extrusion rubber portion which correspond to two portions of the unvulcanized rubber assembly which are divided at a division surface passing through the unvulcanized first rubber member, whereby the unvulcanized first rubber member is partially included in both of the first extrusion rubber portion and the second extrusion rubber portion,
a step of forming a base annular body by winding the first extrusion rubber portion around a cylindrical surface of a rotating body, and
a step of forming the unvulcanized rubber assembly by winding the second extrusion rubber portion around the cylindrical surface of the rotating body so that only the part of the first rubber member of the second extrusion rubber portion overlaps with the part of the first rubber member of the base annular body.

In the tire manufacturing method according to the present invention, the first rubber member may be a sidewall rubber disposed in a sidewall portion of the tire and extending in the tire radial direction.

In the tire manufacturing method according to the present invention, the second rubber member may be a cushion rubber extending radially outwardly from the sidewall rubber.

In the tire manufacturing method according to the present invention, the third rubber member may be a clinch rubber extending radially inwardly from the sidewall rubber.

In the tire manufacturing method according to the present invention, the first extrusion rubber portion may have a triangular cross-sectional shape.

In the tire manufacturing method according to the present invention, in the cross-section including the central axis of the rotating body, the unvulcanized rubber assembly may have a thick part defining the maximum thickness of the unvulcanized rubber assembly, and preferably the interfacial boundary between the first extrusion rubber portion and the second extrusion rubber portion (hereinafter the first interfacial boundary) extends across the thick part.

In the tire manufacturing method according to the present invention, in the above-said cross-section, the length of the first interfacial boundary is preferably larger than the length of a second interfacial boundary between the first rubber member and the second rubber member.

In the tire manufacturing method according to the present invention, in the above-said cross-section, the length of the first interfacial boundary is preferably 40 to 70 mm.

In the tire manufacturing method according to the present invention, in the above-said cross-section including the central axis of the rotating body, the first interfacial boundary is preferably inclined at an angle of not more than 30 degrees with respect to the central axis.

Therefore, according to the present invention, the rubber assembly are divided into two portions extruded separately. As a result, each portion exerts excellent heat dissipation and suppresses deformation and meandering when each extrusion rubber portion is assembled into a green tire. Therefore, a tire having excellent uniformity can be obtained. Further, since the second extrusion rubber portion is wound so that only the first rubber member included in the second extrusion rubber portion overlaps with or contacts with the first rubber member included in the base annular body, the first extrusion rubber portion and the second extrusion rubber portion are strongly adhered and united with each other after vulcanization molding the tire, and a tire having excellent durability can be obtained.

DESCRIPTION OF THE PREFERRED EMBODIMENTS

Figure 1:
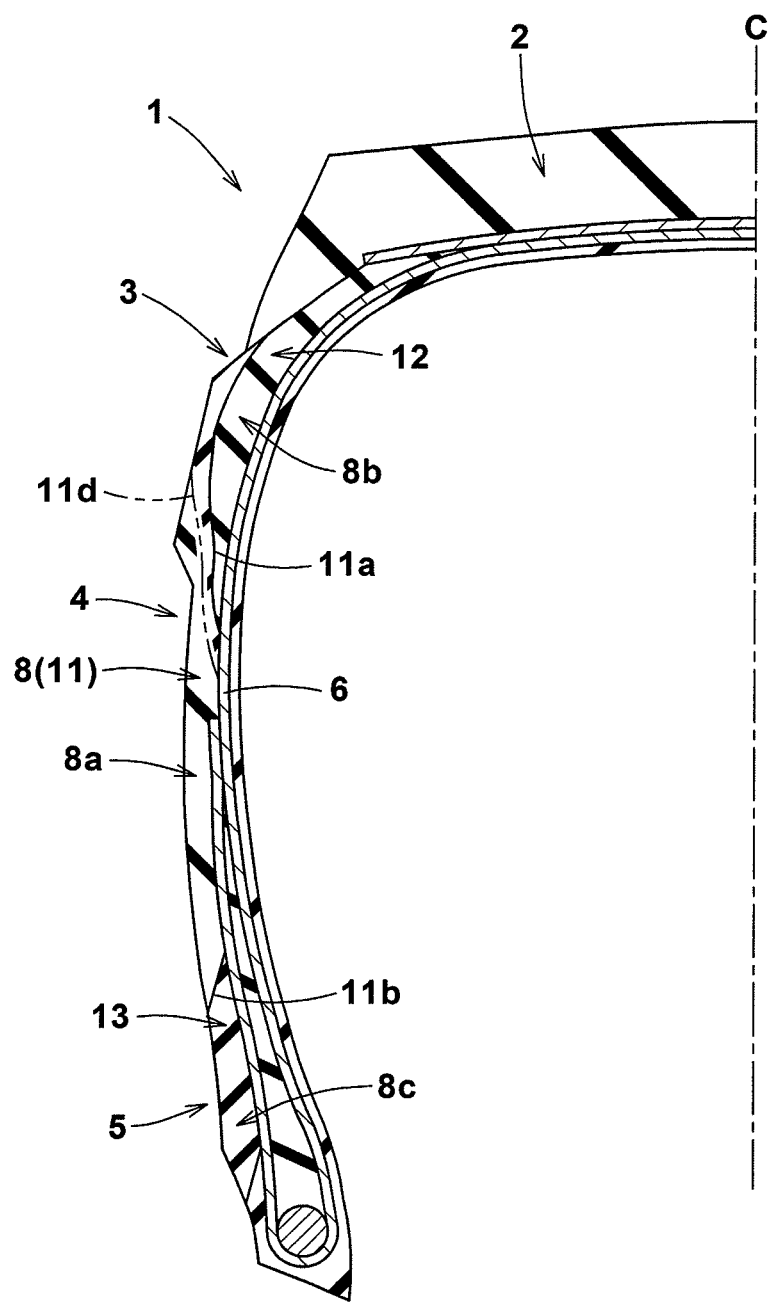
FIG. 1 is a cross-sectional view of a tire manufactured by the method according to the present invention.

Embodiments of present invention will now be described in detail in conjunction with accompanying drawings.

The present invention can be applied to a pneumatic tire and a method of manufacturing a pneumatic tire.

As well known in the art, a pneumatic tire comprises a tread portion 2 whose outer surface defines the tread, a pair of axially spaced bead portions 5 mounted on rim seats, a pair of sidewall portions 4 extending between the tread edges and the bead portions, a carcass 6 extending between the bead portions through the tread portion and the sidewall portions, and a tread reinforcing belt disposed radially outside the carcass in the tread portion. A radially outermost part of each sidewall portion 4 is called "shoulder portion".

FIG. 1 shows an embodiment of the pneumatic tire 1 according to the present invention which is for cross country cars, suvs and the like, namely, for off-road use, and usually provided in the sidewall portions 4 or shoulder portions 3 with protruding portions.

The tire 1 comprises a rubber assembly 8. The rubber assembly 8 in this embodiment is arranged over the shoulder portion 3, the sidewall portion 4 and the bead portion 5. The rubber assembly 8 is however, not limited to such arrangement.

As shown in FIG. 1, the rubber assembly 8 is composed of a first rubber member 11, a second rubber member 12 and a third rubber member 13 which are arranged in series in a direction in the cross-section of the tire 1 including the rotational axis of the tire 1. More specifically, the second rubber member 12 is connected to a first end portion 11a in the above-said direction of the first rubber member 11, and the third rubber member 13 is connected to an opposite second end portion 11b in the above-said direction of the first rubber member 11.

The first rubber member 11 is made of a first rubber composition. The second rubber member 12 is made of a second rubber composition different from the first rubber composition. The third rubber member 13 is made of a third rubber composition different from the first rubber composition.

In this embodiment, the first rubber member 11 is a sidewall rubber 8a disposed in each sidewall portion 4 and extending in the tire radial direction along the outer surface of the tire 1, the second rubber member 12 is a cushion rubber 8b disposed axially inside the sidewall rubber 8a in the shoulder portion 3 and extending radially outwardly beyond the sidewall rubber 8a, and the third rubber member 13 is a clinch rubber 8c extending radially inwardly from the sidewall rubber 8a.

Figure 2:
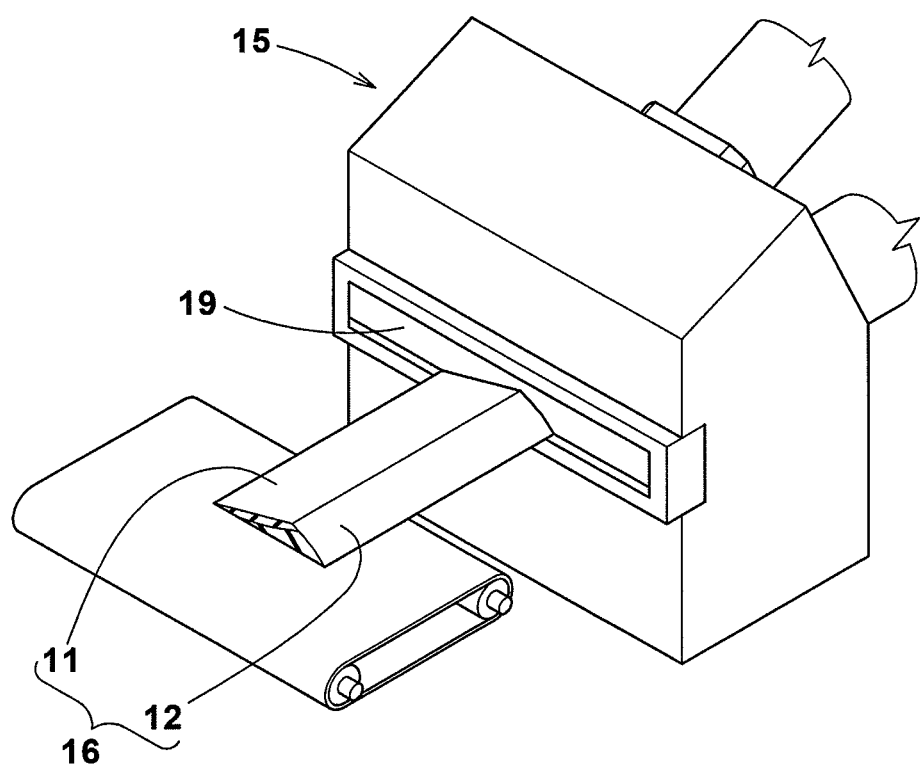
FIG. 2 is a schematic perspective partial view of a rubber extruder used in this embodiment.

An embodiment of the method of manufacturing the tire 1 according to the present invention comprises a step of extruding the unvulcanized rubber assembly 8 with a rubber extruder 15. FIG. 2 shows an example of a nozzle of such rubber extruder 15. AS to the rubber extruder 15, those having known structure may be used, therefore, its detailed description is omitted.

In the step of extruding the unvulcanized rubber assembly 8, a first extrusion rubber portion 16 and a second extrusion rubber portion 17, which correspond to two portions of the unvulcanized rubber assembly 8 divided at a division surface passing through the unvulcanized first rubber member 11, are extruded separately. Thus, the first extrusion rubber portion 16 includes a part of the unvulcanized first rubber member 11, and the second extrusion rubber portion 17 includes the remaining part of the unvulcanized first rubber member 11. FIG. 2 shows that the first extrusion rubber portion 16 is extruded with the rubber extruder 15. The second extrusion rubber portion 17 is extruded with another similar rubber extruder 15 (not shown).

Figure 3A:
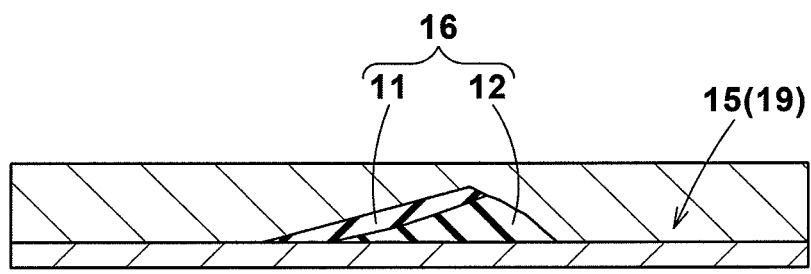
FIG. 3(a) is a cross-sectional view of the first extrusion rubber portion when passing through the nozzle of the rubber extruder.
Figure 3B:
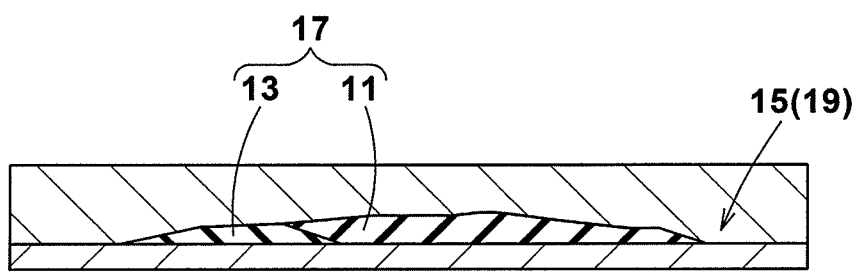
FIG. 3(b) is a cross-sectional view of the second extrusion rubber portion when passing through the nozzle of the rubber extruder.

FIG. 3(a) shows the cross-section of the first extrusion rubber portion 16 when passing through the nozzle 19 of the rubber extruder 15. FIG. 3(b) shows the cross-section of the second extrusion rubber portion 17 when passing through the nozzle 19 of the rubber extruder 15.

As shown in FIG. 3(a), the first extrusion rubber portion 16 includes the part of the first rubber member 11 and the entire second rubber member 12. The first extrusion rubber portion 16 in this example has a triangular cross-sectional shape.

As shown in FIG. 3(b), the second extrusion rubber portion 17 includes the remaining part of the first rubber member 11 and the entire third rubber member 13. The second extrusion rubber portion 17 in this example has a sheet-like shape whose thickness decreases toward its both ends.

The shapes of the first and second extrusion rubber members 16 and 17 are however not limited to such illustrated examples.

Figure 4:
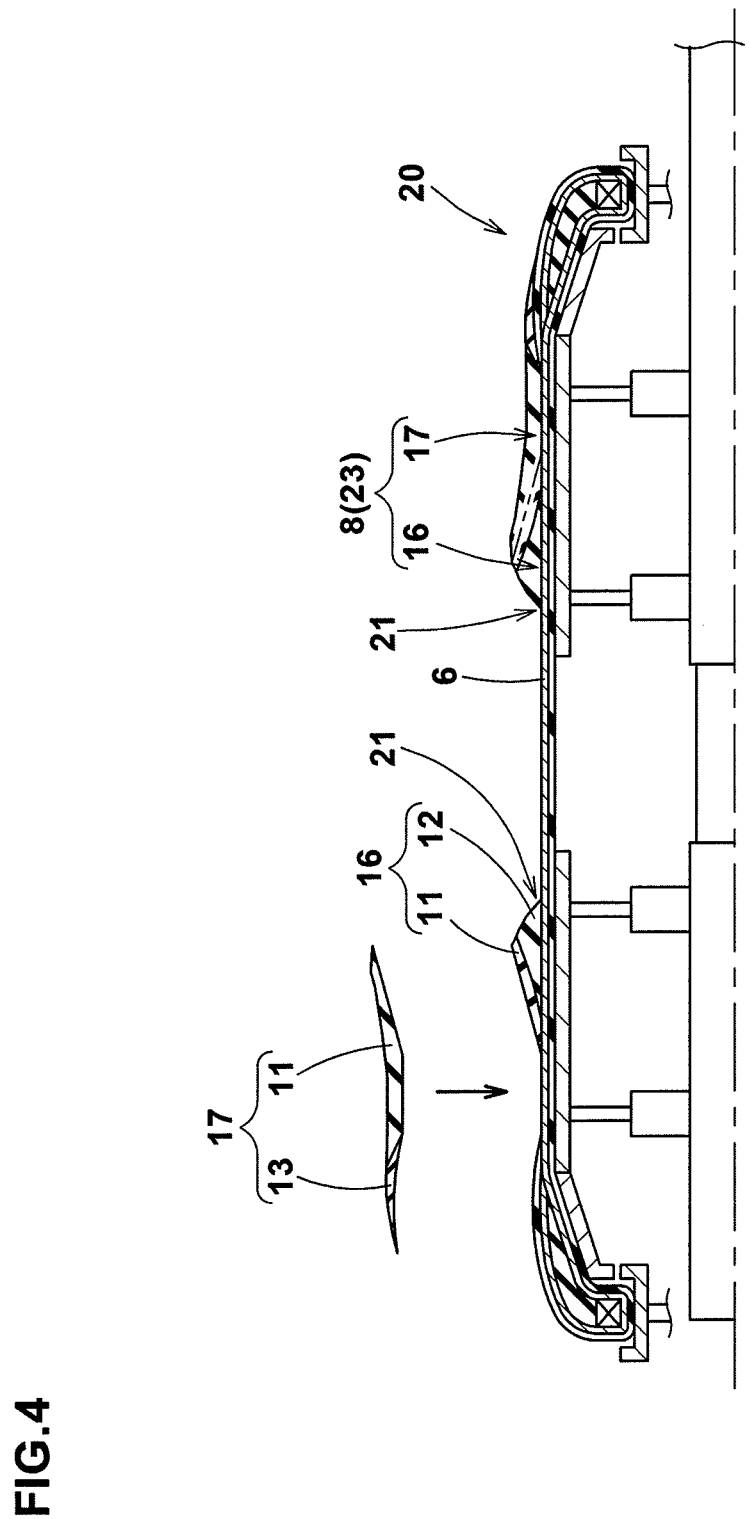
FIG. 4 is a cross-sectional view showing an example of the cylindrical surface of the rotating body.

As shown in FIG. 4, the method of manufacturing the tire 1 according to the present invention further comprises:

a step of winding the first extrusion rubber portion 16 around a cylindrical surface of a rotating body 20 to form a base annular body 21, and a step of winding the second extrusion rubber portion 17 around the cylindrical surface of the rotating body 20 so that only the part of the first rubber member 11 of the second extrusion rubber portion 17 overlaps or contacts with the part of the first rubber member 11 of the wound base annular body 21 to form an unvulcanized assembly 23 which becomes the rubber assembly 8 by vulcanizing.

FIG. 4 shows a cross-sectional view showing an example of the rotating body 20 having the cylindrical surface around which the first extrusion rubber portion 16 and the second extrusion rubber portion 17 are wound.

In this example, the rotating body 20 is a base body of the green tire including a cylindrical raw carcass 6 formed from a strip of rubberized carcass cords which is wound into a cylindrical shape and both ends of which are spliced. This green tire base body further includes bead cores which are disposed on both outer sides thereof and around which the carcass 6 is folded back to form carcass folded back portions.

Therefore, in the tire manufacturing method of the present invention, as shown in FIGS. 1-3(b), the first rubber member 11 (in this example, the unvulcanized sidewall rubber 8a of the finished tire) has an interfacial boundary 11d at which the two extrusion rubber portions 16 and 17 are united during vulcanization molding the tire.

According to the present invention, the rubber assembly 8 are divided and separately extruded as the first extrusion rubber portion 16 and the second extrusion rubber portion 17. Therefore, in comparison with the case where the rubber assembly 8 is extruded as one piece, each of the extrusion rubber portions 16 and 17 exerts excellent heat dissipation. Accordingly, when each extrusion rubber portion is assembled into the green tire, its deformation and meandering can be suppressed. As a result, it becomes possible to obtain the tire having excellent uniformity.

Moreover, according to the present invention, since the second extrusion rubber portion 17 is wound around the cylindrical surface of the rotating body 20 so that only the part of the first rubber member 11 of the second extrusion rubber portion 17 overlaps or contacts with the part of the first rubber member 11 of the base annular body 21, the first the extrusion rubber portion 16 and the second extrusion rubber portion 17 are strongly adhered to each other after the vulcanization molding, therefore, it becomes possible to obtain the tire having excellent durability.

In order to further enhance the above effects, it is preferred that the contact between the first extrusion rubber portion 16 and the second extrusion rubber portion 17 occurs only in the first rubber member 11. In other words, the part of the first rubber member 11 of the second extrusion rubber portion 17 is not in contact with the second rubber member 12 of the first extrusion rubber portion 16.

Figure 5:
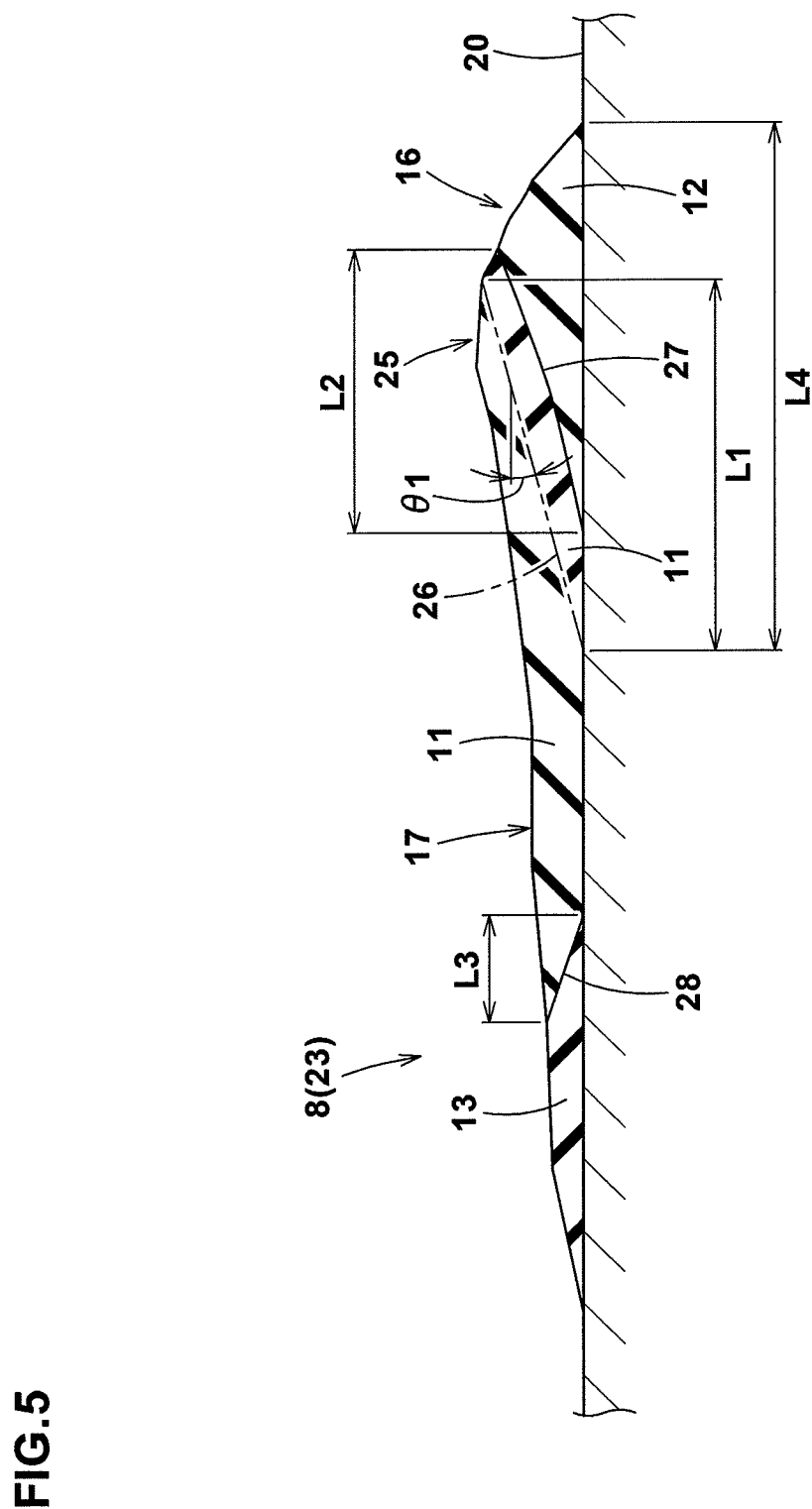
FIG. 5 is an enlarged cross-sectional view of the unvulcanized rubber assembly.

FIG. 5 shows the cross-section of the unvulcanized assembly 23 (becoming the rubber assembly 8 through the vulcanization), which cross-section includes the central axis of the rotating body 20, when the first extrusion rubber portion 16 and the second extrusion rubber portion 17 are wound around the rotating body 20. In FIG. 5, for ease of understanding, the cylindrical surface of the rotating body 20 is shown as if it is continuous and flat. However, the cylindrical surface of the rotating body 20 is not limited to such illustrated example.

As shown in FIG. 5, the unvulcanized rubber 23 (rubber assembly 8) has a thick part 25 defining its maximum thickness. Preferably, the first extrusion rubber portion 16 and the second extrusion rubber portion 17 are overlapped with each other so that the interfacial boundary 26 therebetween extends across the thick part 25. As a result, the thick part 25 which is poor in the heat dissipation is divided and separately extruded, so each extrusion rubber portion can efficiently dissipate heat.

Preferably, the length L1 of the interfacial boundary 26 is larger than the length L2 of the second interfacial boundary 27 between the first rubber member 11 and the second rubber member 12 of the first extrusion rubber portion 16, each length measured in the axial direction of the rotating body 20. Preferably, the length L1 of the interfacial boundary 26 is larger than the length L3 of the third interfacial boundary 28 between the first rubber member 11 and the third rubber member 13 of the second extrusion rubber portion 17, each length measured in the axial direction of the rotating body 20. Thus, the first interfacial boundary 26 secures a sufficient length, and it is possible to prevent the unvulcanized assembly 23 from separating from the first interfacial boundary 26.

From the similar view point, it is preferable that the length of the interfacial boundary 26 measured therealong is 40 to 70 mm.

It is preferable that the interfacial boundary 26 is inclined in the same direction as the second interfacial boundary 27. More preferably, the angular difference between the interfacial boundary 26 and the second interfacial boundary 27 is less than 10 degrees. In this example, the interfacial boundary 26 and the second interfacial boundary 27 are substantially parallel with each other. As a result, for example, when the shoulder portions 3 or the sidewall portions 4 of the tire 1 are deformed during running, the internal stress occurred therein can be shared between the first interfacial boundary 26 and the second interfacial boundary 27, so excellent durability is exhibited.

It is preferable that the interfacial boundary 26 and the third interfacial boundary 28 are inclined in opposite directions.

It is preferable that the interfacial boundary 26 is inclined at an angle $\theta 1$ of not more than 30 degrees with respect to the central axis of the rotating body 20. Such interfacial boundary 26 can secure a sufficient length and can exhibit higher durability against deformation in the tire axial direction of the tread portion 2 and the shoulder portions 3.

Further, it is preferable that the length L4 of the first extrusion rubber portion 16 measured in the axial direction of the rotating body 20 is set in a range from 80 to 100 mm. Such first extrusion rubber portion 16 can improve the durability of the tire and uniformity in a well-balanced manner.

While detailed description has been made of preferable embodiments of the present invention, the present invention can be embodied in various forms without being limited to the illustrated embodiment.

Comparison Tests

Pneumatic tires of size 33×12.50R15 (rim size 10.0×15) having the internal structure shown in FIG. 1 were experimentally manufactured, changing the specification or manufacturing method of the unvulcanized rubber assembly.

In working examples Ex1-Ex8, the unvulcanized rubber assembly 23 (vulcanized rubber assembly 8) as shown in FIG. 5 was manufactured according to the above-described embodiment.

In comparative example Ref, an unvulcanized rubber assembly as shown in FIG. 5 was extruded integrally as one piece with a single rubber extruder.

Then, each test tire was tested for uniformity and durability as follows.

<Uniformity Test>

Using a tire uniformity test machine, the radial force variation (RFv) of each test tire (tire pressure 262 kPa) was measured according to JASO C607: 2000 "Test Procedures for Automobile Tire Uniformity", and the average of the RFV was obtained. The results are indicated in Table 1 by an index based on comparative example Ref being 100, wherein the smaller the numerical value, the smaller the RFV (namely, the better the tire uniformity).

<Durability Test>

Using a drum test machine, each test tire was run continuously under the following conditions, and the travel distance until damage occurred in the sidewall rubber was measured. (speed 80 km/h, tire pressure 262 kPa, tire load, 33.83 kN) The results are indicated in Table 1 by an index based on Comparative example Ref being 100, wherein the larger the numerical value, the better the durability.

TABLE 1

| tire | Ref | Ex1 | Ex2 | Ex3 | Ex4 |
|---|---|---|---|---|---|
| extruding mode of rubber assembly | 1 piece | divided | divided | divided | divided |
| first extrusion rubber portion length L4 (mm) | — | 90 | 90 | 90 | 90 |
| first interfacial boundary length (mm) | — | 55 | 30 | 40 | 70 |
| uniformity | 100 | 73 | 85 | 76 | 81 |
| durability | 100 | 103 | 101 | 103 | 104 |

| tire | Ex5 | Ex6 | Ex7 | Ex8 |
|---|---|---|---|---|
| extruding mode of rubber assembly | divided | divided | divided | divided |
| first extrusion rubber portion length L4 (mm) | 90 | 70 | 80 | 100 |
| first interfacial boundary length (mm) | 80 | 55 | 55 | 55 |
| uniformity | 83 | 82 | 76 | 78 |
| durability | 105 | 102 | 103 | 103 |

As shown in Table 1, it was confirmed that the tires according to the present invention had excellent uniformity and durability.

DESCRIPTION OF THE REFERENCE SIGNS 1 tire
8 rubber assembly
11 first rubber member
12 second rubber member
13 third rubber member
16 first extrusion rubber portion
17 second extrusion rubber portion
20 rotating body
21 base annular body

The invention claimed is:

1. A method for manufacturing a tire,
the tire comprising a rubber assembly of a first rubber member, a second rubber member and a third rubber member made of different compositions
wherein
in a cross-section of the tire including the rotational axis of the tire, the rubber assembly extends in a direction,
the second rubber member is connected to a first end portion of the first rubber member in said direction, and
the third rubber member is connected to a second end portion of the first rubber member in said direction,
the method comprising:
extruding a first extrusion rubber portion and a second extrusion rubber portion separately which correspond to two portions of an unvulcanized rubber assembly divided by a division surface passing through an unvulcanized first rubber member, so that the first extrusion rubber portion includes a part of the unvulcanized first rubber member and a whole of an unvulcanized second rubber member, and the second extrusion rubber portion includes a rest of the unvulcanized first rubber member and a whole of an unvulcanized third rubber member;
forming a base annular body by winding the first extrusion rubber portion around a rotating body; and
forming the unvulcanized rubber assembly by winding the second extrusion rubber portion around the rotating body so that only part of said rest of the unvulcanized first rubber member of the second extrusion rubber portion overlaps with said part of the unvulcanized first rubber member of the base annular body, whereby the unvulcanized first rubber member divided into two by the division surface is united into one body to which the unvulcanized second rubber member and the unvulcanized third rubber member are connected.

2. The tire manufacturing method according to claim 1, wherein the first rubber member is a sidewall rubber disposed in a sidewall portion of the tire and extending in the tire radial direction.

3. The tire manufacturing method according to claim 2, wherein the second rubber member is a cushion rubber extending radially outwardly from the sidewall rubber.

4. The tire manufacturing method according to claim 2, wherein the third rubber member is a clinch rubber extending radially inwardly from the sidewall rubber.

5. The tire manufacturing method according to claim 3, wherein the third rubber member is a clinch rubber extending radially inwardly from the sidewall rubber.

6. The tire manufacturing method according to claim 1, wherein the first extrusion rubber portion has a triangular cross-sectional shape.

7. The tire manufacturing method according to claim 1, wherein, in the cross-section of the unvulcanized rubber assembly including the central axis of the rotating body, the unvulcanized rubber assembly has a thick part defining its maximum thickness, and a first interfacial boundary between the first extrusion rubber portion and the second extrusion rubber portion extends across the thick part.

8. The tire manufacturing method according to claim 2, wherein, in the cross-section of the unvulcanized rubber assembly including the central axis of the rotating body, the unvulcanized rubber assembly has a thick part defining its maximum thickness, and a first interfacial boundary between the first extrusion rubber portion and the second extrusion rubber portion extends across the thick part.

9. The tire manufacturing method according to claim 3, wherein, in the cross-section of the unvulcanized rubber assembly including the central axis of the rotating body, the unvulcanized rubber assembly has a thick part defining its maximum thickness, and a first interfacial boundary between the first extrusion rubber portion and the second extrusion rubber portion extends across the thick part.

10. The tire manufacturing method according to claim 4, wherein, in the cross-section of the unvulcanized rubber assembly including the central axis of the rotating body, the unvulcanized rubber assembly has a thick part defining its maximum thickness, and a first interfacial boundary between the first extrusion rubber portion and the second extrusion rubber portion extends across the thick part.

11. The tire manufacturing method according to claim 5, wherein, in the cross-section of the unvulcanized rubber assembly including the central axis of the rotating body, the unvulcanized rubber assembly has a thick part defining its maximum thickness, and a first interfacial boundary between the first extrusion rubber portion and the second extrusion rubber portion extends across the thick part.

12. The tire manufacturing method according to claim 6, wherein, in the cross-section of the unvulcanized rubber assembly including the central axis of the rotating body, the unvulcanized rubber assembly has a thick part defining its maximum thickness, and a first interfacial boundary between the first extrusion rubber portion and the second extrusion rubber portion extends across the thick part.

13. The tire manufacturing method according to claim 7, wherein, in the cross-section of the unvulcanized rubber assembly, a length of the first interfacial boundary is larger than a length of a second interfacial boundary between the first rubber member and the second rubber member.

14. The tire manufacturing method according to claim 1, wherein, in the cross-section of the unvulcanized rubber assembly including the central axis of the rotating body, a length of a first interfacial boundary between the first extrusion rubber portion and the second extrusion rubber portion is 40 to 70 mm.

15. The tire manufacturing method according to claim 14, wherein, in the cross-section of the unvulcanized rubber assembly including the central axis of the rotating body, the first interfacial boundary is inclined at an angle of not more than 30 degrees with respect to the central axis.

* * * * *